United States Patent
Hann

[11] 3,774,096
[45] Nov. 20, 1973

[54] MOTOR HEATER UNIT

[76] Inventor: Donald R. Hann, 13501 Ward Way, Saratoga, Calif. 95070

[22] Filed: Sept. 17, 1971

[21] Appl. No.: 181,497

[52] U.S. Cl. ................................ 318/436, 318/473
[51] Int. Cl. .............................................. H02b 1/02
[58] Field of Search................... 318/436, 558, 473, 318/6, 40, 159, 430; 219/501, 240

[56] References Cited
UNITED STATES PATENTS

| | | | |
|---|---|---|---|
| 3,247,358 | 4/1966 | Schmidt.............................. | 219/240 |
| 3,515,853 | 6/1970 | McAdams...................... | 219/501 X |
| 2,240,207 | 4/1941 | Crawford........................... | 318/558 |
| 3,403,315 | 9/1968 | Maynard........................... | 318/227 |
| 2,338,518 | 1/1944 | Koch.................................. | 318/558 |
| 3,445,743 | 5/1969 | Blair ................................. | 318/436 |
| 3,582,712 | 6/1971 | Blair ............................. | 318/473 X |

*Primary Examiner*—B. Dobeck
*Attorney*—Hubert E. Duff

[57] ABSTRACT

A motor heater unit is disclosed herein for maintaining an AC electric motor in a warm condition when the motor is turned off. The unit comprises in combination a main power source, a plurality of connector means connecting said main power source to said motor, at least all but one of said plurality of connector means containing switch means for breaking the connection between the motor and the main power source, a timing circuit adjusted to pass a portion of the wave form of an electrical signal applied thereto, the timing circuit being connected across the first of said switch means, a gate means connected to receive the output of said timing circuit, an auxiliary source of electrical energy connected across said first switch means and further connected to receive the output of said gate means, said auxiliary source of electrical energy providing electrical energy only when said gate means triggers said auxiliary source of electrical energy, and, a back e.m.f. quenching means connected across said first switch means.

7 Claims, 4 Drawing Figures

INVENTOR.
DONALD R. HANN

TIMING CIRCUIT OUTPUT — — —
LINE VOLTAGE  ─────

FULL CYCLE OUTPUT OF AUXILIARY
SOURCE OF ELECTRICAL ENERGY — — —

TRIGGERED OUTPUT OF AUXILIARY
SOURCE OF ELECTRICAL ENERGY ─────

MOTOR HEATER UNIT

BACKGROUND OF THE INVENTION

This invention relates to a motor heater unit for maintaining an AC electric motor in a warm condition after the motor is turned off.

One of the main, if not the main, causes of failure in electrical motors is the condensation of moisture on motor windings when the motors are not in operation. When the motor is turned on after moisture has condensed on the windings a short can occur and the entire motor can be thereby burnt out. This is a well known problem recognized by the art.

Many efforts have been made in the past to eliminate condensation within the windings and on the electrical connections of electric motors when the motors are not in operation. Radiant or space heaters are utilized in some instances to prevent such condensation within electric motors when the motors are not in operation. The interior portions of the motor windings and other inaccessable electrical connections are however not always maintained at the desired elevated temperatures by the use of radiant or space heaters. Further, it is generally not economically practicable to provide radiant or space heaters except for very large motors such as 200 horsepower (HP) or larger (NEMA size 6 or above); yet, the great majority of motors are below 200 HP in size (NEMA sizes 1–5).

Another example of prior art motor heater units and processes for maintaining an AC motor in a warm condition when the motor is not in operation comprises providing a small current, well below the rated operating amperage of the motor, fed into the electrical input leads of the motor. The small current keeps the interior of the motor at an elevated temperature and thereby prevents condensation therein. For such units to operate properly however, it is most desirable that they be provided with timing circuits which prevent the heating current from being supplied until the motor has stopped turning after it has been switched off. This prevents the unit supplying the heating current from being damaged by back e.m.f. induced in the armature of the motor. U.S. Pat. No. 3,445,743 issued May 20, 1969 to D. J. Blair describes this type of motor heater unit.

Motor heater units which provide a small current, considerably less than the rated operating amperage of the motor, to the input leads of the motor when the motor is not in operation have the following disadvantages: (1) For proper operation, the motor heating unit must be activated on a time-delay basis to protect the motor heating unit from being damaged by the back e.m.f. induced in the armature of the motor immediately after it has been turned off. Alternatively the motor heating unit must not be connected to the motor until the motor has completely stopped turning. (2) This type of motor heater unit is generally physically quite large and heavy because it requires a transformer and complicated switching circuitry. (3) This type of motor heater unit is generally quite expensive because of the relatively high cost of the components and the cost of assembling these components. (4) The relatively large size and great weight of these motor heating units makes it difficult, if not impossible, to hand them without support upon the motor control box.

In view of the foregoing it is an object of the present invention to provide a small, light-weight an inexpensive motor heater unit which can be directly connected without support to the motor control box.

It is a further object of the invention to provide a motor heater unit that does not require time delay circuitry to protect the motor heater from back e.m.f. induced in the armature of the motor immediately after the motor is turned off.

It is a still further object of the invention to provide a small and inexpensive motor heater unit which is constantly connected to the motor and does not require a complicated switching arrangement to activate it when the motor is not in operation.

It is an additional object of the invention to provide a motor heater unit satisfying all of the above objects and further satisfying the electrical code requirements as set out in the National Electric Code and by the National Electrical Manufacturers Association.

Another object of the invention yet is to provide a novel process for maintaining an AC electric motor in a warmed condition.

Other objects of the invention will become apparent from the description which follows herein.

SUMMARY OF THE INVENTION

The invention comprises a motor heater unit and a process for maintaining an AC electric motor in a warm condition when the motor is not in operation. The motor heater unit comprises in combination a main power source, a plurality of connector means connecting said main power source to said motor, at least all but one of said plurality of connector means containing switch means for breaking the connection between the motor and the main power source, a timing circuit adjusted to pass a portion of the wave form of an electrical signal applied thereto and being connected across the first of said switch means, a gate means connected to receive the output of said timing circuit, an auxiliary source of electrical energy connected across said first switch means and further connected to receive the output of said gate means, said auxilary source of electrical energy providing electrical energy only when said gate means triggers said auxiliary source of electrical energy, and a back e.m.f. quenching means connected across said first switch means.

The invention further comprises a process for maintaining an AC electric motor in a warmed condition when the motor is not in operation by supplying a chopped alternating current signal thereto.

The motor heater unit described herein and the process described herein accomplish the objects set out above.

BRIEF DESCRIPTION OF THE DRAWINGS

For a more detailed understanding of the motor heater unit of the invention reference may be had to the accompanying drawings which are hereby incorporated in and made a part of this specification.

FIG. 1 shows the motor as a single phase motor.

GENERAL DESCRIPTION OF THE INVENTION

Figure 1:
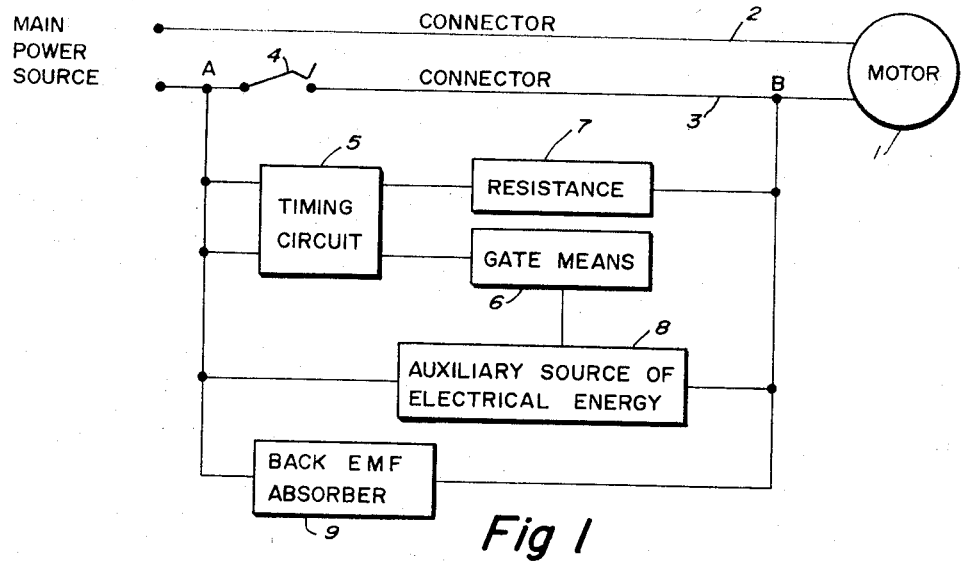
FIG. 1 illustrates a block diagram showing the basic heating unit for the motor and its connections to the motor.

Referring to FIG. 1 there is illustrated a Motor, 1 normally of 200 HP or less rating and more usually of 100 HP or less rating. The motor might be powered for example by a 110 volt AC single phase power source. The motor is connected via Connector 2, Connector 3, and Switch 4 to a terminal board (not shown) which in turn is connected to a main power source.

Connected across the Switch 4 is a Timing Circuit 5. The timing circuit provides a series of electrical impulses to Gate 6. The timing citcuit is isolated from the Connector 3 by the Resistance 7. The Gate 6, which is activated only when the voltage applied to it from the timing circuit reaches at least a minimum positive or negative value, e.g., ± 30 volts serves to trigger the Auxiliary Source of Electrical Energy 8. When less then the minimum positive or negative voltage is applied to the Gate 6, the voltage is dissipated via the Resistance 7. When the Auxiliary Source of Electrical Energy 8 is triggered it provides a portion of a cycle of current, alternately positive or negative, in response to the signal applied to it from the Gate 6. The portions of a cycle of current from the Auxiliary Source of Electrical Energy 8 are supplied to the Motor 1 and they serve to keep the motor warm. The Back e.m.f. Quenching Circuit 9 is also connected across Switch 4. This serves to quench any back e.m.f. induced in the armature of the motor immediately after the Switch 4 is placed in the open position.

It should be noted that when the switch 4 is in the closed position the entire heating unit is still connected to the motor but the unit is completely inoperative and neither draws nor supplies any energy since the potentials of the point A and B are identical.

Figure 2:
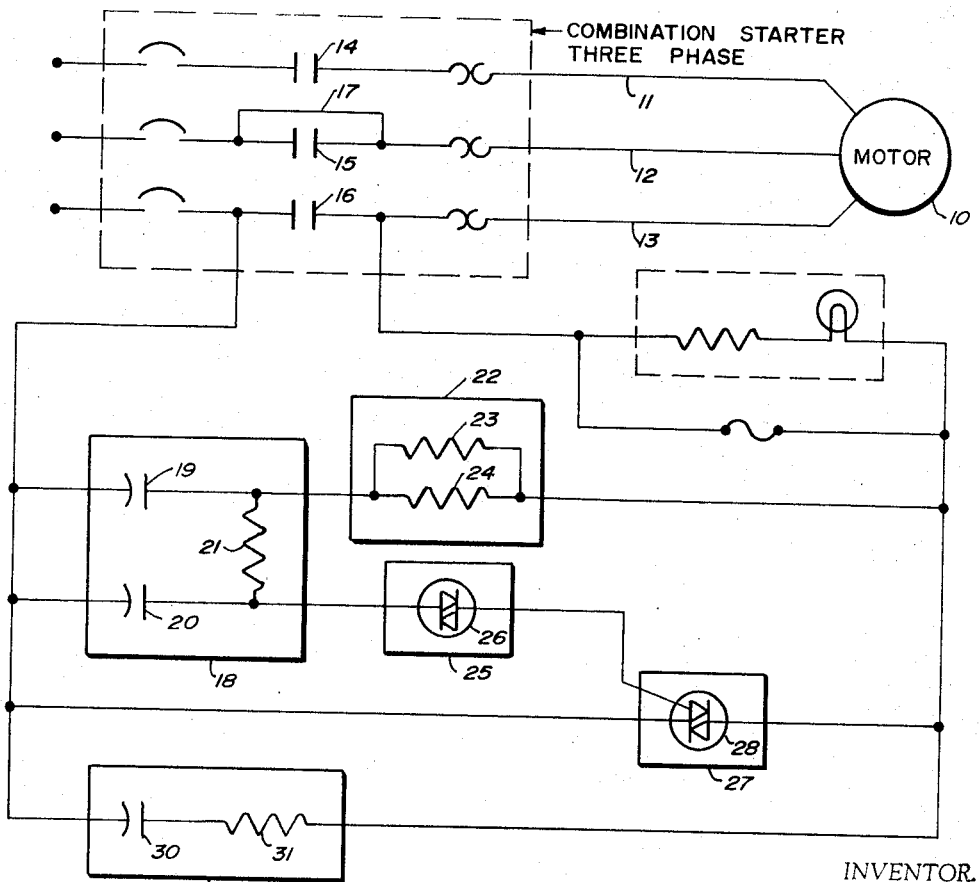
FIG. 2 illustrates a circuit diagram showing the various components in the heating unit in combination with a three-phase motor.

FIG. 2 illustrates the invention in more detail giving a full circuit diagram and further illustrates the invention for use with a three phase motor. The three phase Motor 10 is connected by a plurality of connector means to, for example, a 440 volt three phase main power source. In a typical motor, the Connector Means 11, 12, and 13 will be connected to the main power source via the Contacts 14, 15, and 16. For the heating unit of the present invention to operate with a three phase motor it is necessary that one of the three Connecting Means 11, 12, and 13 not contain a switch, e.g. Connecting Means 12 could be directly connected to one of the three phases without the switch 15, or a Jumper 17 can be provided to complete the connection of one phase (the 0° phase) from the Motor 10 to the main power source.

The Timing Circuit 18 of FIG. 2 is illustrated as consisting of the Capacitors 19 and 20 and the Resistor 21 connected as shown. The Resistance 22 of FIG. 2 is shown as consisting of the Resistors 23 and 24 connected in parallel to one another. The Gate Means 25 of FIG. 2 is shown as a back-to-back diode and more specifically as a solid state Back-to-Back Diode 26. The Auxiliary Source of Electrical Energy 27 of FIG. 2 is shown as a solid state power source 28. The Back e.m.f. Quenching Circuit 29 of FIG. 2 is shown as a Capacitor 30 connected in series with a Resistor 31 and is connected across Switch 16.

OPERATION OF THE HEATING UNIT

Referring to FIG. 1, when the Switch 4 is in the open position the heating unit will begin to draw current from the main power source. The Timing Circuit 5 will convert the substantially sinusoidal voltage signal of the main power source into a signal comprising only a portion of each sinusoidal cycle, e.g. 1° to 150° of each 180° half cycle. When the output from the Timing Circuit 5 is a predetermined positive or negative value, e.g. plus or minus 30 volts, the Gate Means 6 will be activated and will pass a triggering signal to the Auxiliary Source of Electrical Energy 8. Each time the Auxiliary Source of Electrical Energy 8 is activated by a triggering pulse from the Gate Means 6 it will supply a portion of a cycle of electrical current. The shape and amplitude of the output of the timing circuit is determined by the values of the components forming the timing circuit and by the specific arrangement of the components used therein. The portions of cycles of current from the Auxiliary Source of Electrical Energy 8 will then pass through the Motor 1 and keep the motor warm. The parameters of the circuitry can be carefully adjusted to match the characteristics of the motors being heated so that a precise temperature or temperature range can be maintained. More specifically, this is accomplished by adjusting the values of the components of the timing circuit.

When the Switch 4 is in the closed position the points A and B will be at the same potential and hence the heating unit, although connected to the power source and one input of the motor, will not draw any current and will not deliver any current to the motor. The Back e.m.f. Quenching Circuit 9 will absorb any back e.m.f. induced in the armature of the motor when it is suddenly switched off. The Timing Circuit 5 provides initially a slight delay in the application of electric current from the Auxiliary Source of Electrical Energy 8 to the Motor 1 in that the capacitors included in the timing circuit take a finite time to become charged. Thus, after the motor is switched off it will have time to slow down somewhat before the portions of cycles of current are applied thereto from the Auxiliary Source of Electrical Energy 8.

PROCESS

Figure 3:
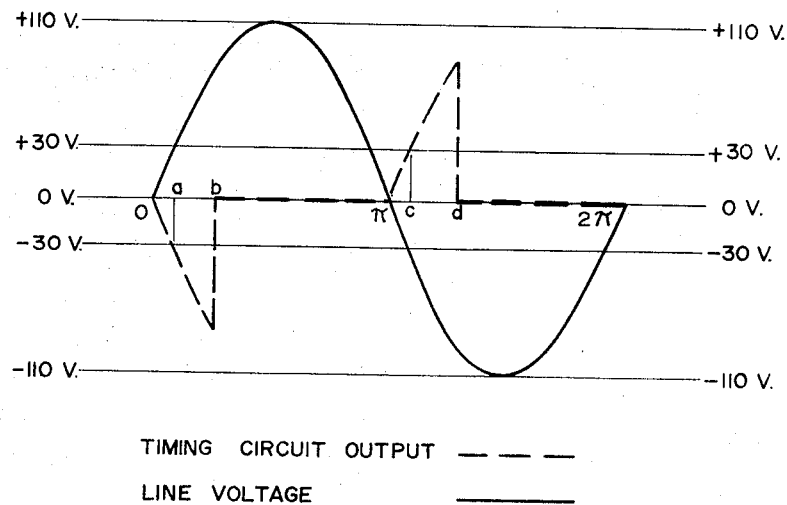
FIG. 3 illustrates the operation at 110 volts of the timing circuit.

In FIG. 3 the output of the timing circuit of FIG. 2 is shown for a line voltage of 110 volts.

FIG. 3 further illustrates the process of the invention. As illustrated in FIG. 3, the output of the timing circuit may attain a nonzero value at zero radians (or elsewhere) and continue for a portion of a cycle, e.g. as illustrated to $b$ radians, assume a zero output and then resume a nonzero output, e.g., from $\pi$ to $d$ radians. From $a$ to $b$ radians and from $c$ to $d$ radians the output of the timing circuit will be sufficiently high, over 30 volts positive or negative as illustrated so that the gate means will be activated which will in turn lead to the triggering of the auxiliary source of electrical energy.

Figure 4:
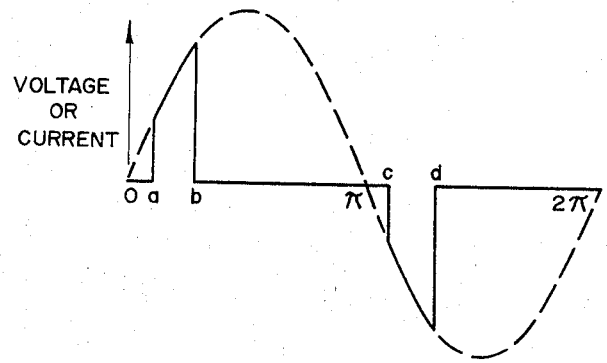
FIG. 4 illustrates the output of the auxiliary power source.

FIG. 4 illustrates the triggered operation of the auxiliary source of electrical energy. When said auxillary source is a full wave silicon switch. When the gate means is activated, from $a$ to $b$ radians and from $c$ to $d$ radians, the auxiliary source of electrical energy sends portions of cycles of current through the motor. The output of the auxiliary source of electrical energy is illustrated for the sake of convenience as being in phase with the line voltage although this will not necessarily be the case during actual operation.

The process of the present invention is thus the application to the windings of an electric motor not in operation of an alternating current composed of chopped or partial portions of sinusoidally alternating current. Preferably, the series of partial portions of supplied sinusoidally alternating current are supplied by solid state circuitry. Further, the portions of cycles of current are supplied by circuitry which is connected to the motor when the motor is in operation as well as when the motor is off but which does not operate when the motor is in operation.

The motor heater unit of the present invention, when solid state circuitry is utilized, is considerably smaller and less expensive than the prior art motor heater units which supply a constant full 360° sinusoidally alternating current of low voltage to the motor when it is shut off. Further, the motor heatihg unit of the present invention does not require the use of a time delay device to protect it from back e.m.f. induced in the armature of the motor when the motor is switched off. Still further, the heating unit of the present invention is always connected to the motor and does not require complicated switching means to connect it thereto.

Any of a number of solid state components may be used as the Back-to-Back Diode 26 or the solid state power source 28. However, we have found that for the Back-to-Back Diode 26 a General Electric ST-2 or RCA Type 40583 DIAC are especially useful and for the solid state power source 28 a General Electric SC60e or RCA Type 2N5441 TRIAC are especially useful. These latter devices are gate-controlled, full-wave silicon AC switches which switch whenever a positive or negative gate voltage above a fixed value is introduced to the gate. Half wave silicon switches may also be utilized. Thus, such switches can serve as a time controlled power supply if keyed to a sinusoidally varying voltage, as shown in FIGS. 3 and 4.

While specific and preferred embodiments of the invention have been described herein, it will be understood that the invention is not meant to be limited thereto since variations therein will be apparent to those skilled in the art. The invention is intended to be limited therefore only by the scope and spirit of the appended claims.

That which is claimed is:

1. A motor heater unit for maintaining an AC electric motor in a warm condition when the motor is not in operation, comprising, in combination:
   a main power source;
   a plurality of connector means connecting said main power source to said motor;
   switch means in at least all but one of said plurality of connector means for turning said motor on and off;
   a timing circuit adjusted to pass a portion of the wave form of an electrical signal applied thereto, said timing circuit being connected across the first switch means;
   a gate means connected to receive the output of said timing circuit;
   an auxiliary power source connected across said first switch means and further connected to receive the output of said gate means, said auxiliary power source providing electrical energy only when said gate means triggers said auxiliary power source; and
   a back e.m.f. quenching means connected across said first switch means.

2. A motor heater unit as in claim 1 wherein said auxiliary power source receives its electrical energy from the line voltage obtained from said first switch means when said switch means is switched to open the connection along the first connector means.

3. A motor heater unit as in claim 2, wherein said gate means comprises a back-to-back diode.

4. A motor heater unit as in claim 3, wherein said back-to-back diode requires at least a minimum positive or negative voltage to activate it.

5. A motor heater unit as in claim 4 wherein said auxiliary power source is a gate-controlled, full-wave or half wave silicon AC switch whose gate input is connected to the output of said gate means.

6. A motor heater unit as in claim 2, wherein the back e.m.f. quenching circuit comprises a resistor and a capacitor connected in series.

7. A motor heater unit for use in conjunction with a main power source to maintain an AC electric motor in a warm condition when said motor is not in operation, comprising, in combination;
   a plurality of connector means connecting said main power source to said motor;
   switch means in at least all but one of said plurality of connector means for turning said motor on and off;
   a timing circuit adaptable for passing a portion of the wave form of an electrical signal applied thereto, said timing circuit being connected across the first of said switch means;
   a gate means connected to receive the output of said timing circuit;
   an auxiliary power source connected across said first switch means and further connected to receive the output of said gate means, said auxiliary power source providing electrical energy only when said gate means triggers said auxiliary power source; and a back E.M.F. quenching means connected across said first switch means.

* * * * *